Figure 1:
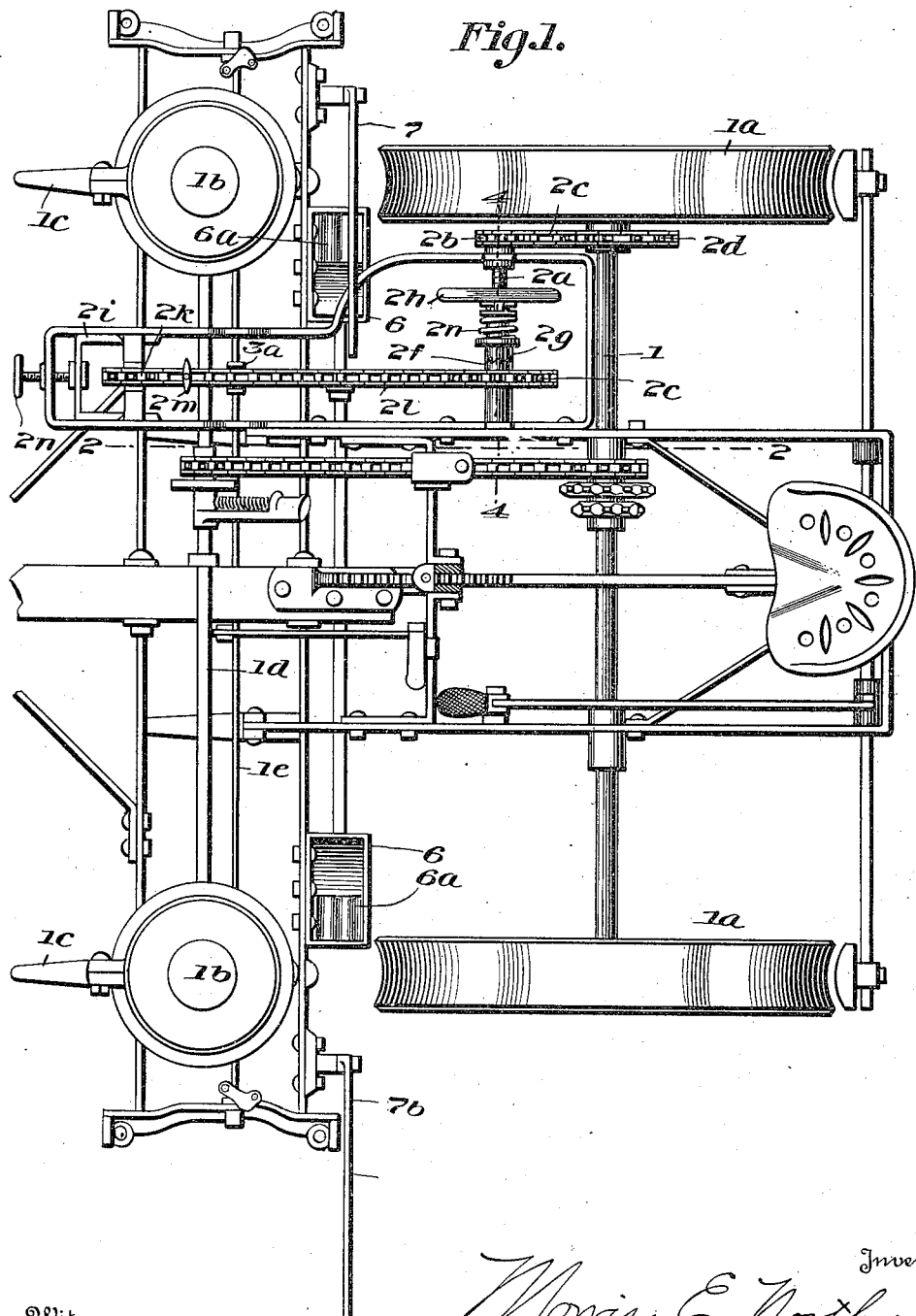

M. E. NORTHWAY.
CHECK ROW AND FERTILIZING ATTACHMENT FOR CORN PLANTING MACHINES.
APPLICATION FILED FEB. 11, 1916.

1,204,586.

Patented Nov. 14, 1916.
2 SHEETS—SHEET 1.

M. E. NORTHWAY.
CHECK ROW AND FERTILIZING ATTACHMENT FOR CORN PLANTING MACHINES.
APPLICATION FILED FEB. 11, 1916.
1,204,586.
Patented Nov. 14, 1916.
2 SHEETS—SHEET 2.
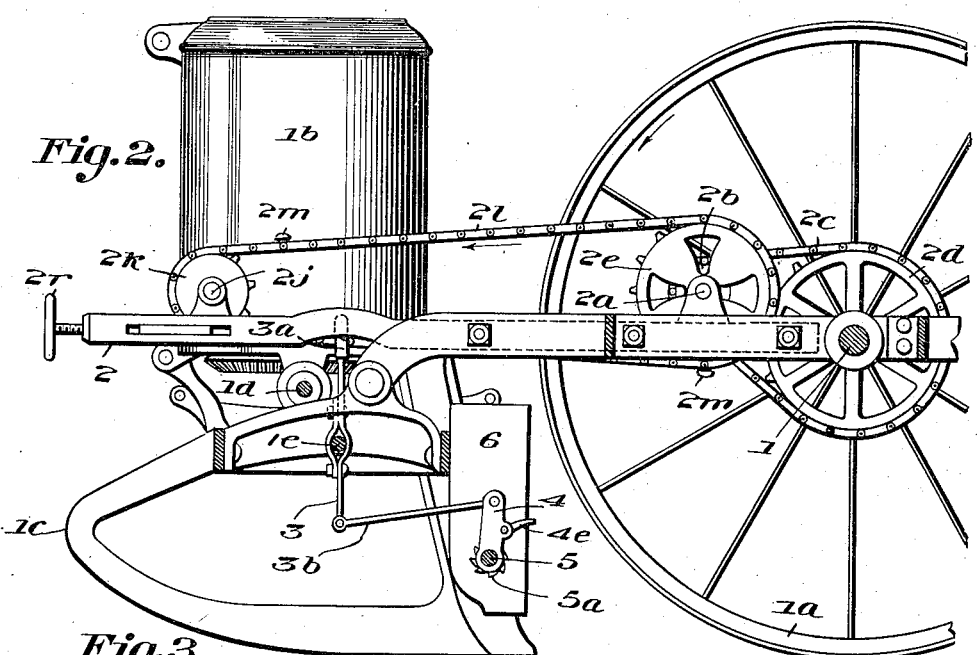
Fig. 2.
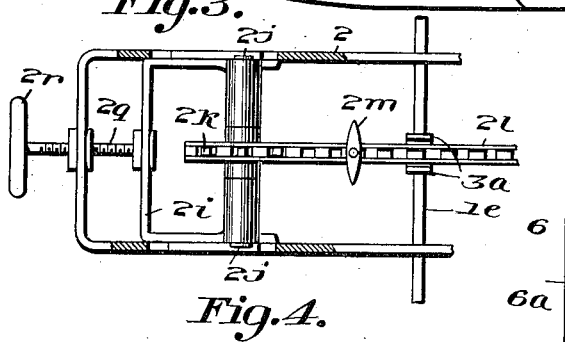
Fig. 3.
Fig. 5.
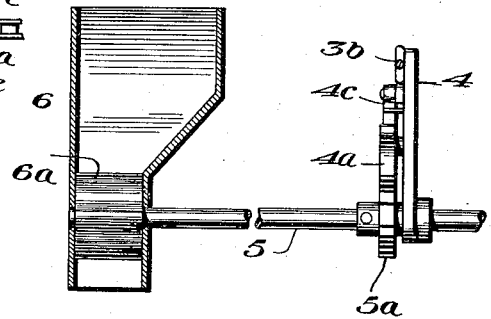
Fig. 4.
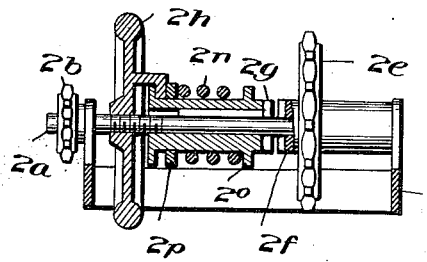
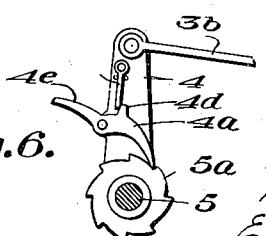
Fig. 6.
Witnesses
Philip E. Barnes
G. R. Kifer
Inventor
Morris E. Northway
By Alexander Howell
Attorneys

UNITED STATES PATENT OFFICE.

MORRIS EDSON NORTHWAY, OF HARTSBURG, MISSOURI.

CHECK-ROW AND FERTILIZING ATTACHMENT FOR CORN-PLANTING MACHINES.

1,204,586.   Specification of Letters Patent.   Patented Nov. 14, 1916.

Application filed February 11, 1916. Serial No. 77,597.

*To all whom it may concern:*

Be it known that I, MORRIS EDSON NORTHWAY, a citizen of the United States, residing at Hartsburg, in the county of Boone and State of Missouri, have invented certain new and useful Improvements in Check-Row and Fertilizing Attachments for Corn-Planting Machines; and I hereby declare that the following is a full, clear, and exact description thereof, reference being had to the accompanying drawings, which form part of this specification.

This invention is a novel attachment for machines for planting corn and the like, and its object is to provide such machines with fertilizer attachments whereby when the seed is dropped a desired amount of fertilizer may also be deposited adjacent the seed and also whereby the operator of the machine may be enabled to plant the seed in properly alined rows and without having to use "check-rower" chains and attachments.

The invention comprises a novel fertilizer dropping mechanism which can be readily attached to planters or machines of various types, and by means of which the seed dropper valves may be operated and fertilizer dropped at the same time, if desired, or the fertilizing can be stopped at the will of the operator.

I will explain the invention as applied to a well known type of corn planting machine, and which will enable others to readily apply the invention to other types of planting machines where an inexpensive fertilizing attachment is desired.

The novel features and combinations of parts comprised in the invention and for which protection is desired are summarized in the claims following the description.

In the drawings: Figure 1 is a top plan view of a corn planting machine showing my novel fertilizing attachment. Fig. 2 is a section on the line 2—2, Fig. 1. Fig. 3 is an enlarged detail top plan view of the front portion of the attachment partly in section. Fig. 4 is an enlarged detail section on line 4—4, Fig. 1. Fig. 5 is a detail section of one of the fertilizer-hoppers showing its valve, and valve operating devices. Fig. 6 is a detail of the pawl and ratchet devices for operating the fertilizer valve shaft.

The corn planting machine shown in Fig. 1 is of a well known type; having a main axle 1 provided with carrying wheels $1^a$; and having a pair of seed boxes $1^b$, and furrow openers or shoes $1^c$. The seed feed disks (not shown) are operated by a rotatable shaft $1^d$ driven from the axle 1 by the usual sprocket gears and chains as indicated in the drawings. The rock shaft $1^e$ operates the seed dropper valves, not shown, in shoes $1^c$ in the usual manner. The machine may be provided with the usual levers and mechanisms for raising and lowering the furrow openers, and for operating the several parts in the customary manner; which it is unnecessary to explain herein, as such parts form no part of the present invention, which resides in and has particular reference to a novel attachment to such a planter whereby the seed may be dropped without the use of check rowing devices and fertilizer may be deposited in or adjacent the seed hills.

The attachment, as illustrated in the accompanying drawings, comprises an elongated metal frame 2 securely attached to the frame of the planter in any convenient manner. Mounted in suitable bearings on said frame near its rear end is a shaft $2^a$, having fast thereon a sprocket wheel $2^b$ driven by a sprocket chain $2^c$ from a sprocket $2^d$ on the main axle 1. Loosely mounted on the shaft $2^a$ is a sprocket $2^e$ having a clutch face $2^f$ on its hub adapted to be engaged by a spring-pressed clutch member $2^g$ splined on shaft $2^a$, and which can be thrown into and out of engagement with sprocket $2^e$ by any suitable means; I prefer to employ a hand wheel $2^h$ having a screw threaded engagement with shaft $2^a$, and a loose engagement with one end of member $2^g$; a spring $2^n$ may be placed on member $2^g$ between washer $2^p$ and a collar $2^o$ on member $2^g$. By turning wheel $2^h$ one way the clutch member $2^g$ can be engaged with clutch member $2^f$, and by turning wheel $2^h$ in the reverse direction such clutch can be disengaged. The particular clutch used is not an essential feature of the present invention.

Slidably mounted upon and near the forward end of the frame 2 is a bracket $2^i$ having bearings in which is mounted a shaft $2^j$ on which is a sprocket $2^k$. An endless sprocket chain $2^l$ runs over the sprockets $2^k$, $2^e$ and said chain carries a plurality of equidistant tappets $2^m$ for a purpose presently set forth. The bracket $2^i$ may be adjusted longitudinally of the frame 2 by means of a screw $2^q$ tapped through one end of the frame 2 and having a rotatable engagement with bracket 2¹; by means of this screw bracket 2¹ can be moved to take up any slack in the sprocket chain 2¹.

Mounted upon and attached to the rock shaft 1ᵉ in any suitable manner is a rocking lever 3 having its upper end 3ᵃ bifurcated; and such bifurcation embraces the lower run of the sprocket chain 2¹ and the bifurcation is adapted to be successively engaged by the tappets 2ᵐ. The lower end of lever 3 is connected by a rod 3ᵇ to a lever 4 loosely mounted upon a shaft 5 which is supported in fertilizer boxes 6 suitably secured to the planter frame, adjacent and in rear of the furrow openers 1ᶜ. The fertilizer boxes 6 are provided with rotary discharge valves 6ᵃ mounted upon the ends of the shaft 5; and within the boxes, (see Fig. 5) so that if the valves 6ᵃ are turned they will discharge a predetermined quantity of fertilizer. The construction of these valves 6ᵃ, *per se*, forms no part of the present invention; and they may be of any desired construction.

A ratchet wheel 5ᵃ is fixedly mounted on shaft 5 adjacent lever 4; and said ratchet wheel is adapted to be engaged by a pawl 4ᵃ pivoted on lever 4, which pawl may be held in or out of engagement with the ratchet by any suitable means. As shown the pawl is normally held in engagement with the ratchet by means of a spring 4ᶜ attached to lever 4 and engaging a lug 4ᵈ on the pawl. The pawl is shown as provided with a tail piece or treadle 4ᵉ, and by depressing this treadle the lug 4ᵈ can be forced to the opposite side of spring 4ᶜ, which will then tend to hold the pawl out of engagement with the ratchet. The pawl can be thrown out of or into operative position by the foot of the operator. Any other suitable devices might be employed however for throwing the pawl into and out of operation at will.

It will be seen that when the machine is in operation the chain 2¹ travels in the direction indicated by the arrow in Fig. 2, and that the tappets 2ᵐ will successively engage the bifurcation 3ᵃ of lever 3 and move the upper end of said lever 3 rearwardly, thereby rocking shaft 1ᵉ and also pulling lever 4 forwardly; thus causing the opening of the seed dropper valves (not shown) controlled by shaft 1ᵉ and through the medium of the pawl 4ᵃ and ratchet 5ᵃ simultaneously operating shaft 5 and causing valves 6ᵃ to discharge the desired amount of fertilizer in or adjacent the hills. Each time that a tappet 2ᵐ clears the bifurcation 3ᵃ the lever 3, shaft 1ᵉ, and connected valves, and lever 4 may be returned to original position by the means (not shown) which are used on such machines to close the seed dropping valves; or if desired suitable springs might be connected to the lever 3 and an adjacent fixed part of the frame so as to insure return of the parts to normal position when lever 3 is released from a tappet, and also closing of the dropper valves.

When the attachment is applied to a planter and in operative condition, as the machine is drawn forward the chain 2¹ is set in motion and the seed is fed from the seed boxes 1ᵇ in the usual manner, and each time lever 3 is operated by a passing tappet the dropper valves are opened to drop the seed in the furrows and simultaneously the fertilizer valves are operated to drop fertilizer with the seed. If it should not be desired to drop fertilizer, the operator can disengage pawl 4ᵃ from ratchet 5ᵃ, and then lever 4 will be swung idly, and the fertilizer valves will not be operated. The operator can with such a machine fertilize the seed only where it is desired, as where the soil is poor; and where the soil is rich he can stop fertilizing; which makes the attachment very useful where planting in fields where the soil varies in richness.

In order to aline the rows as the planting proceeds I provide the machine with markers 7, 7ᵇ, which are pivotally connected to opposite sides of the main frame. The marker 7 is shown in Fig. 1 in inoperative position, and marker 7ᵇ in operative position. These markers are adapted to be used alternately, or according to the direction in which the machine is traveling; and they enable the operator to start a new row at a proper distance from a previously planted row; and also to maintain alinement of the rows by so driving the machine that the marker will drag along the previously planted row, thus maintaining the requisite distance between the rows, the markers being of suitable length for such purpose. At the end of a row the operator can also throw out the clutch 2ᵍ, so as to stop the operation of the attachment while he is turning the machine. Then when the end of the proper marker (7 or 7ᵇ) comes in line with the last planted hill, the machine is ready for operation on the return trip; and he can actuate the attachment manually if necessary (as by pulling on chain 2¹) until the first hill of seed and fertilizer are dropped, and then by throwing the clutch 2ᵍ into engagement can proceed with the planting and fertilizing of the return row in a well understood manner.

If the operator has not been planting fertilizer but is using the attachment to operate the seed dropper-valves; he can when near the end of a row throw the fertilizer attachment into operation for the last one or two hills, so that the fertilizer will enable him to more readily distinguish where the seed has been dropped, and after turning the machine he can position it for planting the return row by moving the machine until the end of the proper marker (7, or 7ᵇ)

comes to the last planted hill in the previous row; then he proceeds in the manner above stated.

What I claim is:

1. An attachment for seed planting machines comprising a frame adapted to be attached to the main frame of the machine, a shaft journaled in one end of said frame, a sprocket loosely mounted on said shaft, a sprocket wheel journaled in the other end of the frame, clutch devices for locking the sprocket to said shaft; and a sprocket chain running over said sprockets and provided with tappets; a lever adapted to be mounted upon the seed valve shaft of the machine and projecting in one direction into the path of the said tappets to be operated thereby and in the opposite direction to operate fertilizer dropping mechanism, and means for driving said shaft from the axle of the machine, substantially as described.

2. An attachment for seed planting machines, comprising a frame adapted to be attached to the machine, a shaft journaled in said frame, a sprocket loosely mounted on said shaft, clutch devices on said shaft for locking said sprocket to the shaft, a slidable support mounted in said frame near the end thereof remote from said shaft, a sprocket journaled in said slidable support, a sprocket chain running over said sprockets and provided with tappets, and means for adjusting said sliding frame to tension said sprocket chain; fertilizer boxes attachable to the furrow openers of the machine and provided with valves, a valve operating shaft mounted between said fertilizer boxes, an oscillating lever adapted to be mounted on the seed shaft of the machine and have its upper end projected into the path of the said tappets on the chain to be operated thereby, operative connections between said lever and said valve operating shaft, and means for driving the shaft in said frame from the main axle of the machine, substantially as described.

3. An attachment for seed planting machines comprising a frame adapted to be attached to the main frame of the machine, a shaft journaled in one end of said frame, a sprocket loosely mounted on said shaft, a sprocket wheel journaled in the other end of the attachment frame, clutch devices for locking the sprocket to said shaft, a sprocket chain running over said sprockets and provided with tappets; fertilizer boxes attachable to the furrow openers of the machine and provided with valves, a shaft for operating the fertilizer valves supported by said fertilizer boxes, an oscillating lever adapted to be mounted upon the seed valve shaft of the machine and have its upper end projected into the path of the tappets to be operated thereby, operative means on the fertilizer valve shaft, connections between the said means and the said oscillating lever, and means for driving the shaft in said frame from the axle of the machine.

In testimony that I claim the foregoing as my own, I affix my signature.

MORRIS EDSON NORTHWAY.

Copies of this patent may be obtained for five cents each, by addressing the "Commissioner of Patents, Washington, D. C."